2,977,278
ANIONIC-CARRIER IODINE COMPOSITIONS FOR CONTROLLING MICROORGANISMS

Morris V. Shelanski, Bridgeport, Pa., and Murray W. Winicov, Flushing, N.Y., assignors to West Laboratories, Inc., Long Island City, N.Y., a corporation of New York No Drawing. Filed Mar. 4, 1958, Ser. No. 718,959

12 Claims. (Cl. 167—17)

This invention relates to preparations for controlling microorganisms, particularly bacteria, fungi, and molds. More particularly, the invention relates to compositions wherein iodine is complexed with certain anionic surface active agents.

The present application is a continuation-in-part of our pending application Serial No. 622,783, filed November 19, 1956, now U.S. Patent No. 2,868,686, which in turn is a continuation-in-part of application Serial No. 283,983, filed April 23, 1952 (now abandoned). Said prior applications were directed to, and defined in the claims thereof, compositions for controlling microorganisms wherein iodine bromide is complexed with anionic and nonionic surface active agents which form complexes with elemental iodine. The present application differs from said prior applications in that it is directed to the anionic carrier-iodine complexes per se as disclosed, but not claimed, in said prior applications.

Iodine is recognized as an excellent bactericide. However, it cannot be efficiently used in its free form because of its high vapor pressure resulting in excessive loss of the free iodine when applied to control microorganisms. In view of its poor solubility in water (only 0.0162 part of iodine dissolve in 100 parts of water at 0° C. and 0.09566 part of iodine dissolve in 100 parts of water at 60° C.), it cannot be used in the form of an aqueous solution. A solution of iodine in the common water miscible solvents for iodine, such as acetone, ethyl alcohol, methyl alcohol, glycols and glycerol, cannot be used effectively to control microorganisms because in water much of the iodine will be precipitated promptly and is lost in aqueous dilution of the solution without exercising its germicidal action. The addition of an iodine solution in a water immiscible solvent, such as carbon tetrachloride, benzene and ether, to water containing microorganisms does not result in control of the microorganisms because little of the iodine dissolves in the water, the amount thus dissolved being limited by the solubility of iodine in water which as above noted is very small.

It has been proposed to produce iodine complexes, i.e. to incorporate iodine in a surface active agent or detergent, referred to herein as an iodine carrier, which complexes when added to aqueous media gradually release the iodine as free iodine so that it is germicidally effective. While a number of nonionic surface active agents, particularly those in the form of polyoxyalkylene condensates, are effective carriers for iodine, it is found that not all surface active agents falling within the anionic grouping are suitable as iodine carriers.

We have found, in accordance with the present invention, that a limited group of anionic surface active agents can be complexed with elemental iodine to thereby provide anionic carrier-iodine complexes which can be freely diluted with water to provide use solutions containing releasable iodine in quantities effective for many environmental sanitation purposes, and the like.

Anionic surface active agents for use in preparing anionic carrier-iodine complexes in accordance with the present invention includes alkyl aryl sulfonates which in the alkyl group have from 3 to 30, preferably 5 to 20, carbon atoms, and the aryl group of which is phenyl or naphthyl. In the case of the naphthyl compounds, the alkyl group preferably takes the form of two alkyl substituents with a total of 6 to 10 carbon atoms. Alkyl aryl sodium sulfonate, potassium sulfonate, ammonium sulfonate, or sulphonic acid may be used. The expression "alkyl aryl sulfonates" is intended to include the free acid and the ammonium, alkali metal, and organic amine salts.

In preparing the new anionic carrier-iodine complexes, elemental iodine can be dissolved directly in the carrier if liquid, or in a heated carrier if it can be liquefied by moderate heating above room temperature. If the carrier is a solid, such carrier can be dissolved in water to form a concentrated aqueous solution and the elemental iodine added thereto to effect complexing.

The amount of iodine complexed with the anionic carrier can be within the range of about 0.1 to 30% and suitably about 1 to 3% based on the weight of the surface active agent. It will be understood, however, that the preferred concentration of iodine in the complex will depend upon the particular type of use preparation desired in controlling microorganisms.

The anionic carrier-iodine complex can, if desired, be utilized directly in preparing use dilutions in aqueous media containing iodine concentrations suitable for controlling microorganisms, i.e. from about 5 to 10 p.p.m. up to several hundred p.p.m., depending upon the intended use and the quantity of microorganisms to be destroyed. Alternatively, the preparations may be partially diluted or extended with water or other solvent media, or with a water soluble extender which is inert to iodine, such as urea, to provide practical concentrates for distribution which in turn are diluted to provide the final aqueous use solutions. Likewise the preparation may be diluted or extended with compatible acids for the purpose of extending the germicidal activity of the anionic-iodine complex. Such concentrates can suitably contain from about 0.1 to 50% or more of the anionic carrier-iodine preparation, having regard for convenience in packaging and intended dilution by the user in preparing use solutions.

The following examples will demonstrate typical anionic carrier-iodine complexes in accordance with our invention, but it is to be understood that these examples are given by way of illustration and not of limitation.

Example I

An anionic carrier-iodine complex is prepared by dissolving in a minimum amount of water 95 parts by weight of alkyl benzene sodium sulfonate in which the alkyl substituents are $C_{12}$ to $C_{18}$ groups, and dissolving therein 3 parts by weight of iodine supplied as iodine crystals.

The above complex can be diluted with water to provide, for example, a 0.5% iodine product for distribution. Subsequent dilution in water at the rate of about 1 to 100 provides a use solution containing about 50 p.p.m. of releasable iodine and forming a use solution suitable for cleansing of floors, walls, sinks and other surfaces in general environmental sanitation.

Example II

An anionic carrier-iodine complex is prepared containing by weight:

40 parts of alkyl ($C_{12}$ to $C_{18}$) benzene triethanolamine sulfonate
30 parts hydroxy acetic acid
2 parts iodine
28 parts water.

The alkyl benzene sulfonate, hydroxy acetic acid, and iodine are dissolved in the water while heating to a temperature of about 60° C. in a closed container. The resulting complex can be further diluted and used as described in Example I.

*Example III*

An anionic carrier-iodine complex is prepared containing by weight:

39 parts of alkyl ($C_{12}$ to $C_{18}$) benzene triethanolamine sulfonate
23 parts phosphoric acid
2.6 parts iodine
35.4 parts water.

The alkyl benzene sulfonate, phosphoric acid and iodine are dissolved in the water while heating to a temperature of about 60° C. in a closed container. The resulting complex can be further diluted and used as described in Example I.

*Example IV*

An anionic carrier-iodine complex is prepared containing by weight:

30 parts of alkyl ($C_{12}$ to $C_{18}$) benzene triethanolamine sulfonate
22 parts hydroxy acetic acid
21 parts phosphoric acid
1.45 parts iodine
25.55 parts water.

The alkyl benzene sulfonate, acids and iodine are dissolved in the water while heating to a temperature of about 60° C. in a closed container. The resulting complex can be further diluted and used as described in Example I.

This type of formulation, containing both hydroxyacetic acid and phosphoric acid is particularly desirable for use with hard water since the phosphoric acid tends to protect the hydroxyacetic acid. While the above formulation is particularly adapted for use with water having 100 p.p.m. of hardness, the ratio of hydroxyacetic acid to phosphoric acid can be varied to provide optimum performance.

*Example V*

An anionic carrier-iodine complex is prepared containing by weight:

13 parts of dibutyl naphthyl sodium sulfonate
1.5 parts hydroxyacetic acid
0.5 part iodine
17.5 parts water.

The dibutyl naphthyl sulfonate, acid, and iodine are dissolved in the water by stirring for about 2 hours while heating to 60° C. in a closed container. The resulting complex can be further diluted and used as described in Example I.

*Example VI*

An anionic carrier-iodine complex is prepared containing by weight:

5.5 parts alkyl ($C_{12}$ to $C_{18}$) benzene sodium sulfonate
1 part iodine
40 parts hydroxyacetic acid
53.5 parts water.

The alkyl benzene sulfonate, hydroxyacetic acid, and iodine are dissolved in the water while heating to a temperature of about 60° C. in a closed container. The resulting complex can be further diluted and used as described in Example I. It is particularly suited for use with very hard waters.

Various changes and modifications in the foregoing compositions will occur to those skilled in the art, and to the extent that such changes and modifications are embraced by the appended claims, it is to be understood that they constitute part of our invention.

We claim:

1. A composition for the control of microorganisms consisting essentially of a complex of iodine with an anionic surface active agent selected from the group consisting of alkyl phenyl sulfonates and alkyl naphthyl sulfonates, wherein the alkyl group has from 3 to 30 carbon atoms, said complex containing 0.1 to 30% of iodine based upon the weight of said surface active agent.

2. A composition for the control of microorganisms, as defined in claim 1, wherein said complex contains about 1 to 3% of iodine.

3. A composition for the control of microorganisms, as defined in claim 1, wherein the anionic surface active agent is alkyl benzene sodium sulfonate in which the alkyl substituents are $C_{12}$ to $C_{18}$ groups.

4. A composition for the control of microorganisms, as defined in claim 1, wherein the anionic surface active agent is alkyl ($C_{12}$ to $C_{18}$) benzene triethanolamine sulfonate.

5. A composition for the control of microorganisms, as defined in claim 1 wherein the anionic surface active agent is a dialkyl naphthyl sulfonate with a total of 6 to 10 carbon atoms in the alkyl substituents.

6. A composition for the control of microorganisms, as defined in claim 1, wherein the anionic surface active agent is dibutyl naphthyl sodium sulfonate.

7. A composition for the control of microorganisms, as defined in claim 1, wherein said complex is associated with a water miscible extender inert to iodine forming a concentrate adapted for dilution with water to provide a use solution of said complex.

8. A composition for the control of microorganisms, as defined in claim 7, wherein the amount of anionic carrier-iodine complex constitutes about 0.1 to 50% of said concentrate.

9. A composition for the control of microorganisms, as defined in claim 7, wherein the water miscible extender is an acid.

10. A composition for the control of microorganisms, as defined in claim 7, wherein the water miscible extender is phosphoric acid.

11. A composition for the control of microorganisms, as defined in claim 7, wherein the water miscible extender is hydroxyacetic acid.

12. A composition for the control of microorganisms, as defined in claim 7, wherein the water miscible extender is a mixture of hydroxyacetic and phosphoric acids.

References Cited in the file of this patent

UNITED STATES PATENTS

| | | |
|---|---|---|
| 2,077,298 | Zelger | Apr. 13, 1937 |
| 2,599,140 | Taub | June 3, 1952 |
| 2,759,869 | Sulton et al. | Aug. 21, 1956 |
| 2,868,686 | Shelanski et al. | Jan. 13, 1959 |

FOREIGN PATENTS

| | | |
|---|---|---|
| 659,698 | Great Britain | Oct. 24, 1951 |

OTHER REFERENCES

West: J. Chem. Physics, vol. 15, p. 689 (1947).
Chemical and Eng. News, Feb. 19, 1951, p. 664, vol. 29.